United States Patent
Hernandez

(10) Patent No.: US 10,608,577 B2
(45) Date of Patent: Mar. 31, 2020

(54) SYSTEM AND COMPUTER-IMPLEMENTED METHOD FOR CONTROLLING MOTOR OPERATION USING PROGRAMMABLE MULTIPLEXED TAP LOGIC

(71) Applicant: Nidec Motor Corporation, St. Louis, MO (US)

(72) Inventor: Hector M. Hernandez, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 16/239,349

(22) Filed: Jan. 3, 2019

(65) Prior Publication Data

US 2019/0214935 A1    Jul. 11, 2019

Related U.S. Application Data

(60) Provisional application No. 62/615,365, filed on Jan. 9, 2018.

(51) Int. Cl.
*H02P 31/00* (2006.01)

(52) U.S. Cl.
CPC ..................... *H02P 31/00* (2013.01)

(58) Field of Classification Search
CPC ..................................................... H02P 31/00

USPC ................................................... 318/494, 34

See application file for complete search history.

(56) References Cited

U.S. PATENT DOCUMENTS 5,977,898 A * 11/1999 Ling .................... H03M 1/682
    341/144

* cited by examiner

*Primary Examiner* — David Luo
(74) *Attorney, Agent, or Firm* — Hovey Williams LLP

(57) ABSTRACT

A system and computer-implemented method for improving controlling the operation of an alternating current electric motor using programmable multiplexed tap input logic. Programmed bit patterns and corresponding tap numbers are stored in a look-up table in a non-volatile electronic read-write memory element. Input channels are monitored for tap input signals, and an input bit pattern is formed based on the tap input signals. The input bit pattern is compared to the programmed bit patterns, and if the input bit pattern matches a particular programmed bit pattern, then a control signal is transmitted to activate the particular tap number which corresponds to the particular programmed bit pattern, thereby controlling the operation of the motor. If there is no active tap, then the motor is turned off. The programmed bit patterns and/or the corresponding tap numbers may be changed by writing to the look-up table in the non-volatile electronic read-write memory element.

17 Claims, 3 Drawing Sheets

SYSTEM AND COMPUTER-IMPLEMENTED METHOD FOR CONTROLLING MOTOR OPERATION USING PROGRAMMABLE MULTIPLEXED TAP LOGIC

RELATED APPLICATIONS

The present U.S. non-provisional patent application is related to and claims priority benefit of an earlier-filed U.S. provisional patent application with the same title, Ser. No. 62/615,365, filed Jan. 9, 2018. The entire content of the identified earlier-filed application is hereby incorporated by reference into the present application as if fully set forth herein.

FIELD

The present invention relates to systems and methods for controlling the operation of electric motors, and more particularly, embodiments concern a system and computer-implemented method for improving controlling the operation (i.e., speed and/or torque) of an electric motor by a motor controller using programmable multiplexed tap input logic stored in non-volatile electronic read-write memory.

BACKGROUND

Alternating current (AC) electric motors are considered constant-speed devices, but their speeds can be varied by changing the input voltages or frequencies or by changing the windings that make the electric motors rotate. The most common way of changing the speed of an AC electric motor is to vary the input frequency using an inverter as the power supply, which has become more popular with the increased development and decreased cost of power electronics. Another way of changing the speed involves reducing the voltage to the motor windings using resistors, transformers, or motor winding taps, which is preferred for certain applications.

In particular, an AC electric motor may be provided with a particular number of taps on its main winding, and these taps allow the electric motor to run with different voltages applied to its magnetic field. Typically, the number of taps and the number of speeds available for a particular electric motor is not more than four. A common application of this method involves fans that have low, medium, and high speeds which are selectable with simple switches. For this and similar applications, it is generally not necessary to achieve exact motor speeds, and it is desirable to keep costs relatively low.

Tap-based motor interfaces have either direct tap inputs or multiplexed tap inputs which base outputs on tap input patterns at multiple input channels. If a different tap input pattern is desired, the firmware must be reprogrammed with a different tap input logic, which causes delays and increased costs. Further, the number of valid taps is fixed by the hardware and the software.

This background discussion is intended to provide information related to the present invention which is not necessarily prior art.

SUMMARY

Embodiments concern a system and computer-implemented method for improving controlling the operation (i.e., speed and/or torque) of an electric motor by a motor controller using programmable multiplexed tap input logic stored in non-volatile electronic read-write memory. The various embodiments advantageously overcome a particular problem (i.e., lack of flexibility with regard to total number and available combinations of tap inputs) by providing a particular improvement solution (i.e., programmable multiplexed tap input logic stored in non-volatile electronic read-write memory) in a particular field (i.e., motor control) using a particular machine (i.e., a motor controller).

In a first embodiment, a system is provided for improving controlling operation of an electric motor using a programmable multiplexed tap input logic. The system may broadly comprise a non-volatile electronic read-write memory element, an input mechanism, a plurality of input channels, a processing element; and a motor controller. The non-volatile electronic read-write memory element may be configured to store a plurality of programmed bit patterns, with each programmed bit pattern corresponding to a particular tap number, wherein one or more of the programmed bit patterns or the corresponding tap numbers are changeable by writing to the non-volatile electronic read-write memory element. The input mechanism may be configured to allow for generating one or more tap input signals, and the plurality of input channels may be configured to receive the tap input signals. The processing element may be configured to form an input bit pattern based on the tap input signals received by the input channels; compare the input bit pattern to the programmed bit patterns stored in the non-volatile electronic read-write memory element; and if the input bit pattern matches a particular programmed bit pattern, then output a control signal to activate the particular tap number corresponding to the particular programmed bit pattern. The motor controller may be configured to control operation of the electric motor, including receiving the control signal and activating the particular tap number corresponding to the particular programmed bit pattern.

Various implementations of the first embodiment may include any one or more of the following features. The electric motor may be an alternating current electric motor. The system and the electric motor may be incorporated into a residential or commercial system, such as a gas or electric furnace, an air handler, or an outdoor condenser. The plurality of programmed bit patterns and the corresponding tap numbers may be stored in the non-volatile electronic read-write memory element in the form of a look-up table. At least the non-volatile electronic read-write memory element and the processing element may be incorporated into the motor controller. The system may further include the electric motor itself.

In a second embodiment, a computer-implemented method is provided for improving controlling operation of an electric motor with a motor controller using a programmable multiplexed tap input logic. The method may broadly comprise the following performed by the motor controller. One or more variables may be initialized. A plurality of input channels may be monitored for one or more tap input signals, and an input bit pattern may be formed based on the tap input signals. The input bit pattern may be compared to a plurality of programmed bit patterns stored in a non-volatile electronic read-write memory element. If the input bit pattern matches a particular programmed bit pattern, then a control signal may be transmitted to activate the particular tap number which corresponds to the particular programmed bit pattern, thereby controlling operation of the alternating current electric motor. One or more of the programmed bit patterns or corresponding tap numbers may be changed by writing to the non-volatile electronic read-write memory element.

Various implementations of the second embodiment may include any one or more of the following features. The electric motor may be an alternating current electric motor. The system and the electric motor may be incorporated into a residential or commercial system, such as a gas or electric furnace, an air handler, or an outdoor condenser. The programmed bit patterns and the corresponding tap numbers may be stored in the non-volatile electronic read-write memory element in the form of a look-up table. Initializing the variables may include setting a flag to indicate that operation of the electric motor will be controlled based on the multiplexed tap inputs, and/or populating an array with the programmed bit patterns and corresponding tap numbers. If there is no active tap, the motor controller may turn off the electric motor. The motor controller may continuously monitor the plurality of input channels for one or more new tap input signals This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
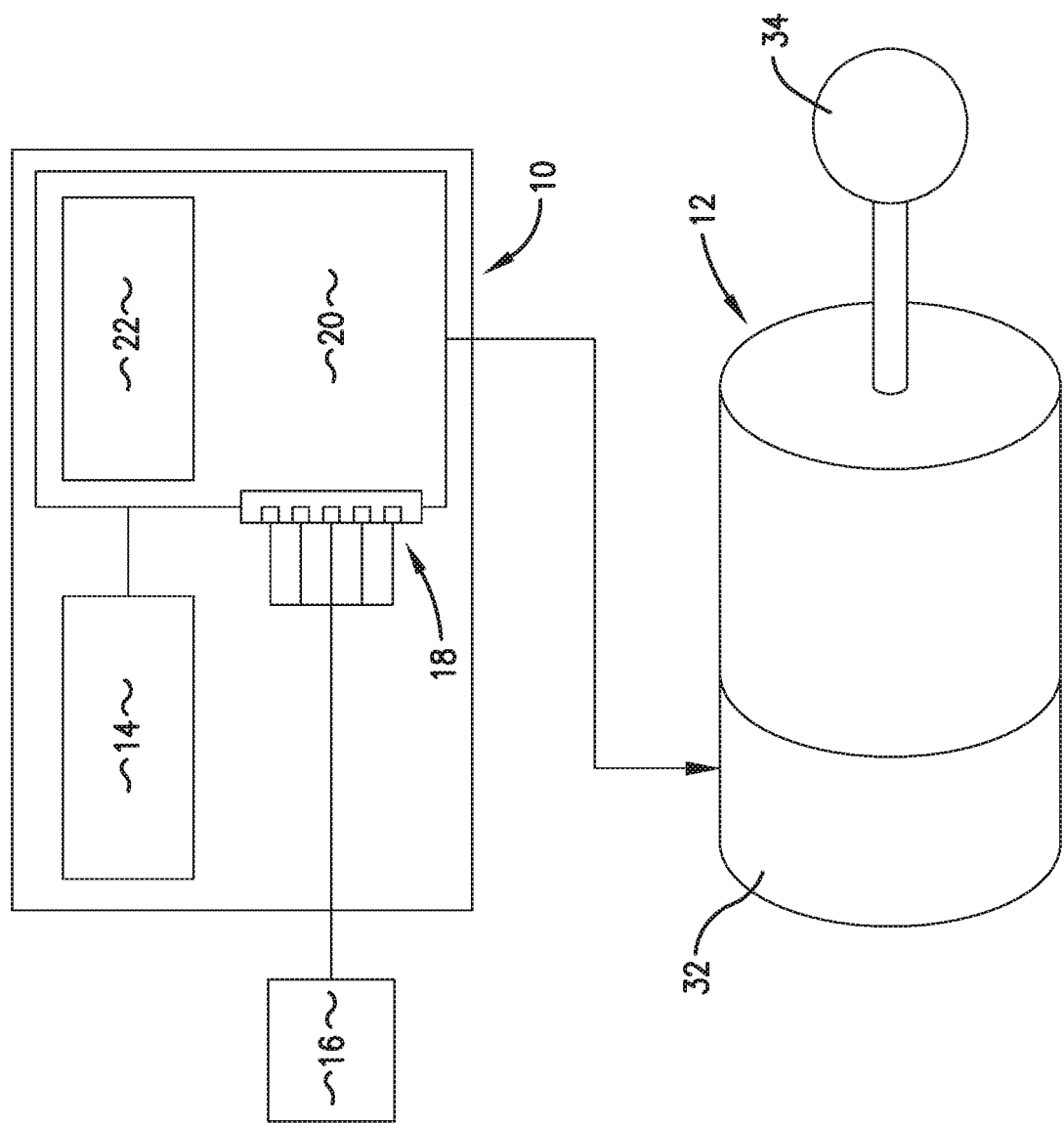
FIG. 1 is a hardware diagram of an embodiment of a system for controlling the operation (i.e., speed and/or torque) of an exemplary electric motor using programmable multiplexed tap input logic stored in non-volatile electronic read-write memory.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments concern a system and computer-implemented method for improving controlling the operation (i.e., speed and/or torque) of an electric motor by a motor controller using programmable multiplexed tap input logic stored in non-volatile electronic read-write memory. In more detail, embodiments allow for modifying the combinations of tap input patterns and the number of different tap combinations without having to produce and upload new software to existing firmware, and for increasing the number of available tap patterns by increasing a number of tap inputs (e.g., to nine (9)) beyond an original number of tap input channels (e.g., five (5)) without having to create new firmware based on the number of taps or the specific tap input logic. New tap input logic may be coded in non-volatile electronic read-write memory to increase or decrease the number of unique tap inputs. The non-volatile electronic read-write memory may not be part of the FLASH/ROM memory of the existing firmware. The firmware may interpret the tap input pattern using the tap input logic stored in the non-volatile electronic read-write memory, and based thereon, control the speed and/or torque of the electric motor according to the demand represented by the tap input pattern. The available number of valid taps may be decreased by setting the bit pattern corresponding to a specific tap to all zeros. Potential applications for embodiments of the present technology may include residential or commercial systems such as gas or electric furnaces, air handlers, and outdoor condensers.

Figure 2:
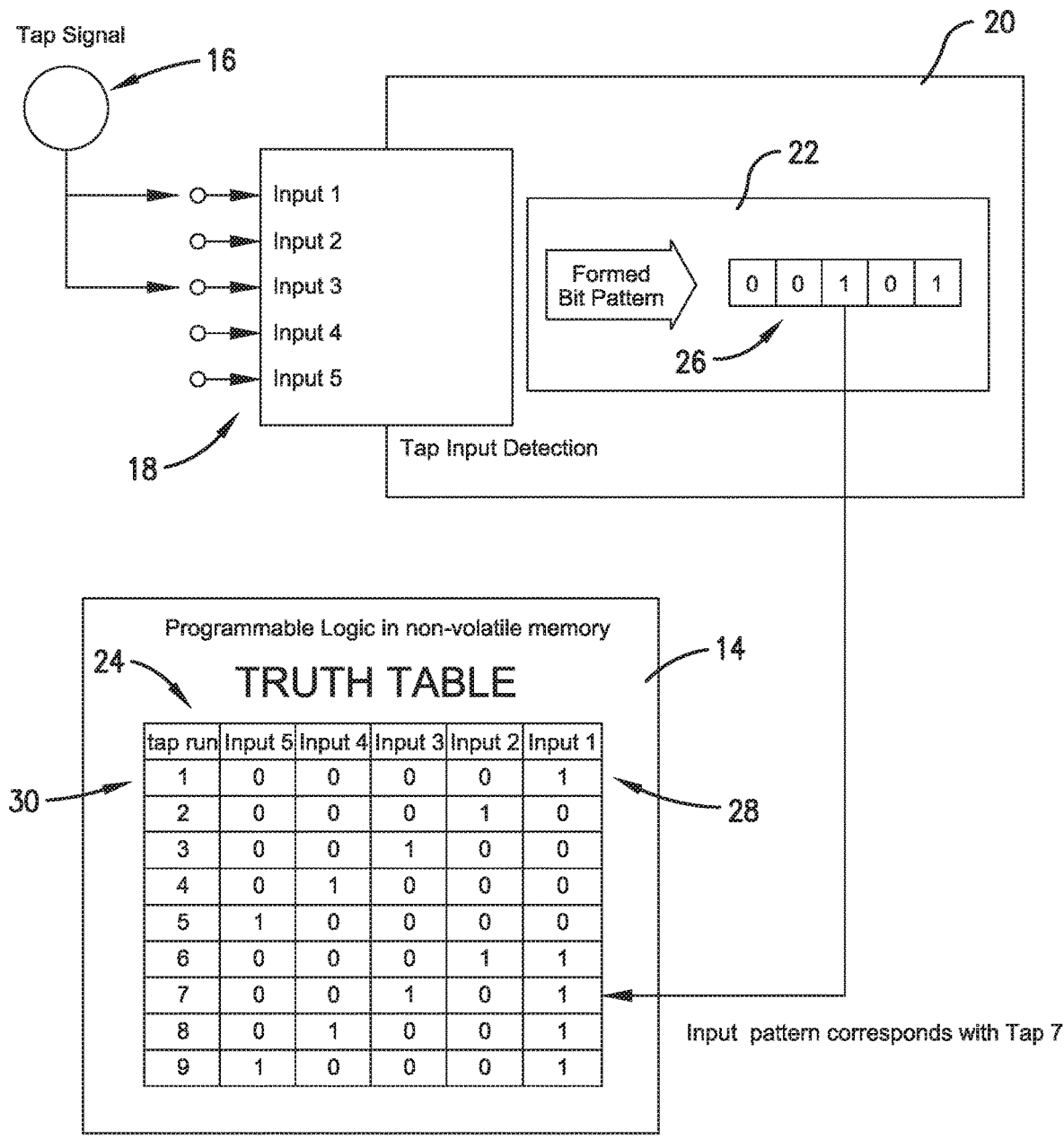
FIG. 2 is depiction of aspects of the system of FIG. 1.

Referring to FIGS. 1 and 2, an embodiment of a system 10 is shown configured to control a speed and/or torque of an AC electric motor 12 using programmable multiplexed tap input logic. The system 10 may broadly comprise a non-volatile electronic read-write memory element 14, an input mechanism 16, a plurality of input channels 18, a processing element 20, and a computer program 22. The non-volatile electronic read-write memory element 14 may be configured to store a plurality of programmed bit patterns, with each programmed bit pattern corresponding to a particular tap number. The programmed bit patterns and the corresponding tap numbers may be stored in the form of a look-up table 24. The non-volatile electronic read-write memory element 14 may include substantially any suitable conventional or non-conventional memory technology that allows for storing data in the form of an original plurality of programmed bit patterns, with each programmed bit pattern corresponding to a particular tap number, and that allows for receiving and storing a changed plurality of programmed bit patterns whenever such change is desired or needed. The change may concern one or more bit patterns and/or their correspondences to particular tap numbers, and may be accomplished by physically or wirelessly connecting to the non-volatile electronic read-write memory element 14 in order to overwrite the previous data.

The input mechanism 16 may be configured to allow for generating one or more tap input signals, and the plurality of input channels 18 may be configured to receive the generated tap input signals from the input mechanism 16. The input mechanism 16 may include substantially any suitable conventional or non-conventional input mechanism technology, such as one or more physical or virtual switches, dials, buttons, or keypads.

The processing element 20 may be configured to execute the computer program 22. The processing element 20 may include substantially any suitable conventional or non-conventional processor technology. The computer program 22 may be configured to form an input bit pattern 26 based on the tap input signals received by the input channels 18; compare the input bit pattern 26 to the plurality of programmed bit patterns 28 stored in the non-volatile electronic read-write memory element 14; and if the input bit pattern 26 matches one of the programmed bit patterns 28, then transmit a control signal to activate the particular tap number 30 which corresponds to the matching programmed bit pattern, thereby controlling the speed and/or torque of the electric motor 12.

In one embodiment, the system 10 may be physically incorporated into the motor controller 32 associated with and configured to control the electric motor 12, while in another embodiment, the system 10 may be physically distinct from but in permanent or temporary wired or wireless electronic communication with the motor controller 32. In both such embodiments, an output of the system 10 may be used by the motor controller 32 to improve its functioning with regard to controlling the operation of the electric motor 12. Relatedly, the electric motor 12 itself may be an integral part of the overall system. The electric motor may drive a load 34, which may be, for example, a component of a residential or commercial system such as a gas or electric furnace, an air handler, or an outdoor condenser.

Figure 3:
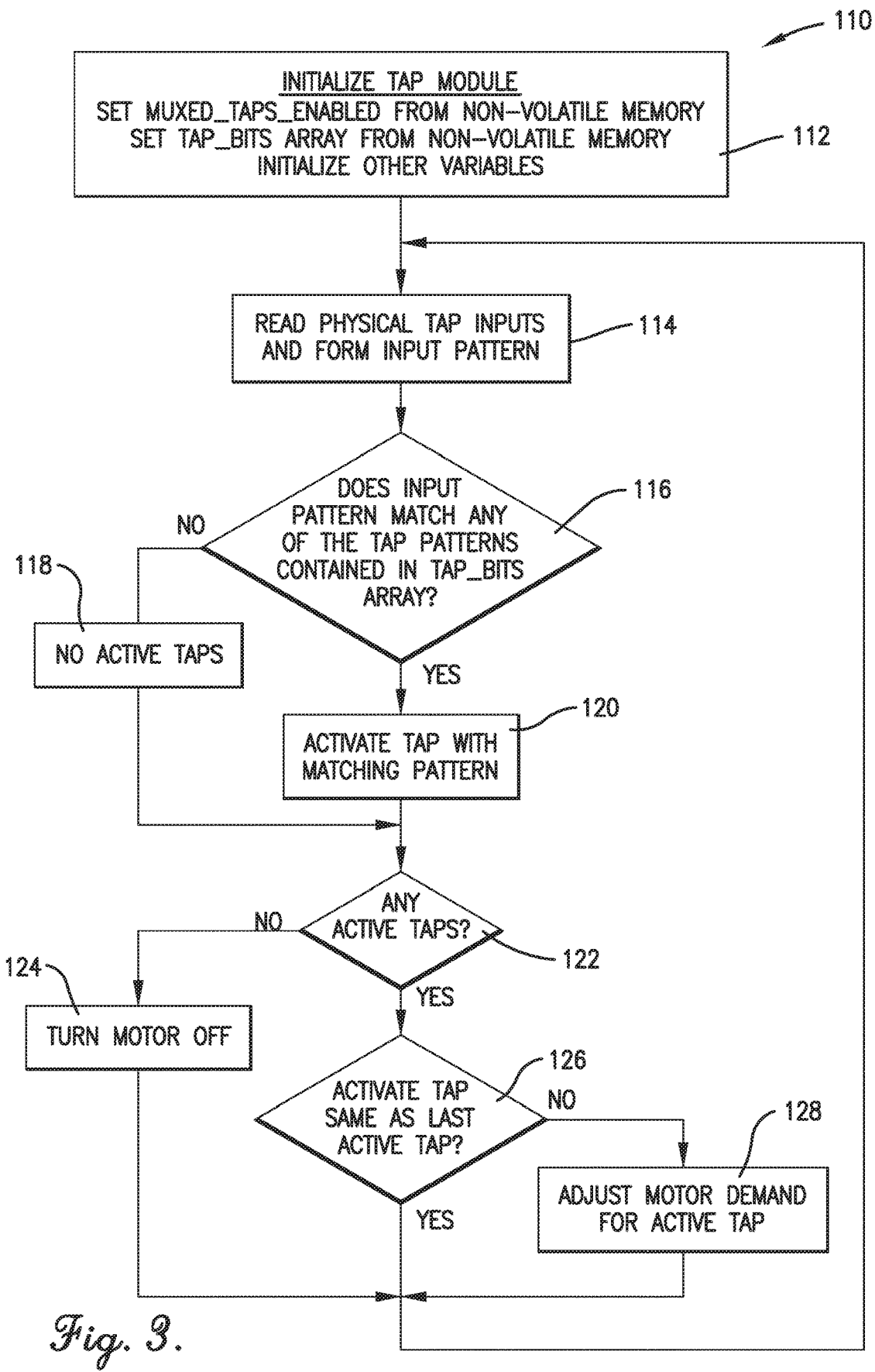
FIG. 3 is a flowchart of steps involved in an embodiment of a computer-implemented method for controlling the operation (i.e., speed and/or torque) of an electric motor using programmable multiplexed tap input logic stored in non-volatile electronic read-write memory.

Referring also to FIG. 3, in operation, the system 10 may function substantially as follows. The computer program 22 may monitor each of the input channels 18 to determine whether a valid tap input signal is present, and based on all of the valid tap input signals present, the computer program 22 may form an input bit pattern 26, as shown in 114. The computer program 22 may then compare the input bit pattern 26 to each programmed bit pattern 28 in the non-volatile electronic read-write memory element 14, as shown in 116, and if the input bit pattern 26 matches a programmed bit pattern 28, then the computer program 22 may activate the tap number 30 corresponding to the matching programmed bit pattern 28 to thereby control the speed and/or torque of the electric motor 12, as shown in 118. In general, the system 10 may return to step 114 and resume monitoring for new tap input signals.

The system 10 may include more, fewer, or alternative components and/or perform more, fewer, or alternative actions, including those discussed elsewhere herein, and particularly those discussed in the following section describing the computer-implemented method.

Referring again to FIGS. 2 and 3, an embodiment of a computer-implemented method 110 is shown configured to improve controlling a speed and/or torque operation of the electric motor 12 using programmable multiplexed tap input logic stored in non-volatile electronic read-write memory. The method 110 may be a corollary to the functionality of the above-described system 10, and may be similarly implemented using the various components of the system 10. In particular, the method 110 may be implemented at least in part by the motor controller 32. The computer-implemented method may broadly comprise the following.

One or more relevant variables may be initialized in preparation for subsequent operation, as shown in 112. For example, a flag, which may be referred to as a "muxed_taps_enabled" flag, may be set to indicate that the speed and/or torque of the electric motor 12 will be controlled by the computer program 22 based on the multiplexed tap inputs, and the array which forms the look-up table 24, which may be referred to as a "tap_bits" array, and which may be stored in the non-volatile memory element 14, may be populated with the plurality of programmed bit patterns 28 and corresponding tap numbers 30. This step may include both initializing the array 24 with original programmed bit patterns and corresponding tap numbers, and re-initializing the array with changed programmed bit patterns and/or corresponding tap numbers.

The input mechanism 16 may be used to enter tap input signals, and each of the input channels 18 may be read or otherwise monitored to determine whether a valid tap input signal is present, and based on all of the valid tap input signals present, the input bit pattern 26 may be formed, as shown in 114. The input bit pattern 26 may be compared to each programmed bit pattern 28 in the non-volatile electronic read-write memory 14, as shown in 116.

If the input bit pattern 26 does not match a programmed bit pattern 28, then no new tap number may be activated, as shown in 118. If the input bit pattern 26 does match one of the programmed bit patterns 28, then the tap number 30 corresponding to the matching programmed bit pattern may be activated, as shown in 120.

It may then be determined whether there is any active tap (i.e., if there is a newly activated tap or a prior activated tap), as shown in 122, and if not, then the electric motor 12 may be turned off, as shown in 124. If there is a newly activated tap, then it may be determined whether the newly activated tap is the same as the prior activated tap, as shown in 126, and if so, then no control signal may be sent. However, if there is a newly activated tap, and the newly activated tap is different from the prior activated tap, then a control signal may be sent to adjust the electric motor 12 demand for the newly active tap, as shown in 128. In general, the method 110 may then return to step 114 and resume monitoring for new tap input signals as desired or needed.

The computer-implemented method 110 may include more, fewer, or alternative actions, including those discussed elsewhere herein.

It will be appreciated and understood by those with ordinary skill in the art and others that the above-described embodiments advantageously overcome a particular problem (i.e., lack of flexibility with regard to total number and available combinations of tap inputs) by providing a particular improvement solution (i.e., programmable multiplexed tap input logic stored in non-volatile electronic read-write memory) in a particular field (i.e., motor control) using a particular machine (i.e., a motor controller).

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for improving controlling operation of an electric motor using a programmable multiplexed tap input logic, the system comprising:
   an input mechanism configured to allow for generating one or more tap input signals;
   a plurality of input channels configured to receive the one or more tap input signals;
   a non-volatile electronic read-write memory element configured to store a plurality of programmed bit patterns, with each programmed bit pattern corresponding to a particular tap number, wherein one or more of the programmed bit patterns or the corresponding tap numbers are changeable by writing to the non-volatile electronic read-write memory element;

a processing element configured to—
form an input bit pattern based on the one or more tap input signals received by the plurality of input channels,
compare the input bit pattern to the plurality of programmed bit patterns stored in the non-volatile electronic read-write memory element, and
if the input bit pattern matches a particular programmed bit pattern from the plurality of programmed bit patterns, then output a control signal to activate the particular tap number corresponding to the particular programmed bit pattern; and
a motor controller configured to control operation of the electric motor, including receiving the control signal and activating the particular tap number corresponding to the particular programmed bit pattern.

2. The system of claim 1, wherein the electric motor is an alternating current electric motor.

3. The system of claim 1, wherein the system and the electric motor are incorporated into a residential or commercial system selected from the group consisting of: gas or electric furnaces, air handlers, and outdoor condensers.

4. The system of claim 1, wherein the plurality of programmed bit patterns and the corresponding tap numbers are stored in the non-volatile electronic read-write memory element in the form of a look-up table.

5. The system of claim 1, wherein at least the non-volatile electronic read-write memory element and the processing element are incorporated into the motor controller.

6. The system of claim 1, further including the electric motor.

7. A system for improving controlling operation of an alternating current electric motor using a programmable multiplexed tap input logic, the system comprising:
an input mechanism configured to allow for generating one or more tap input signals;
a plurality of input channels configured to receive the one or more tap input signals; and
a motor controller configured to control operation of the electric motor, and including—a non-volatile electronic read-write memory element configured to store a plurality of programmed bit patterns, with each programmed bit pattern corresponding to a particular tap number in a look-up table, wherein one or more of the programmed bit patterns or the corresponding tap numbers are changeable by writing to the non-volatile electronic read-write memory element;
a processing element configured to—
form an input bit pattern based on the one or more tap input signals received by the input channels,
compare the input bit pattern to the plurality of programmed bit patterns stored in the non-volatile electronic read-write memory element, and
if the input bit pattern matches a particular programmed bit pattern from the plurality of programmed bit patterns, then output a control signal to activate the particular tap number corresponding to the particular programmed bit pattern, thereby controlling operation of the alternating current electric motor,
wherein the system and the alternating current electric motor are incorporated into a residential or commercial system selected from the group consisting of: gas or electric furnaces, air handlers, and outdoor condensers.

8. The system of claim 7, wherein the plurality of input channels are incorporated into the motor controller.

9. The system of claim 7, further including the alternating current electric motor.

10. A computer-implemented method for improving controlling operation of an electric motor with a motor controller using a programmable multiplexed tap input logic, the computer-implemented method comprising:
performing by the motor controller the following actions—
initializing one or more variables,
monitoring a plurality of input channels for one or more tap input signals,
forming an input bit pattern based on the one or more tap input signals,
comparing the input bit pattern to a plurality of programmed bit patterns stored in a non-volatile electronic read-write memory element,
if the input bit pattern matches a particular programmed bit pattern from the plurality of programmed bit patterns, then outputting a control signal to activate the particular tap number which corresponds to the particular programmed bit pattern, thereby controlling operation of the electric motor, and
changing one or more of the programmed bit patterns or corresponding tap numbers by writing to the non-volatile electronic read-write memory element.

11. The computer-implemented method of claim 10, wherein the electric motor is an alternating current electric motor.

12. The computer-implemented method of claim 10, wherein the system and the electric motor are incorporated into a residential or commercial system selected from the group consisting of: gas or electric furnaces, air handlers, and outdoor condensers.

13. The computer-implemented method of claim 10, wherein the plurality of programmed bit patterns and the corresponding tap numbers are stored in the non-volatile electronic read-write memory element in the form of a look-up table.

14. The computer-implemented method of claim 10, wherein initializing one or more variables includes setting a flag to indicate that operation of the electric motor will be controlled based on the multiplexed tap inputs.

15. The computer-implemented method of claim 10, wherein initializing one or more variables includes populating an array with the plurality of programmed bit patterns and corresponding tap numbers.

16. The computer-implemented method of claim 10, further including if there is no active tap, the motor controller turning off the electric motor.

17. The computer-implemented method of claim 10, further including the step of continuously monitoring the plurality of input channels for one or more new tap input signals.

* * * * *